Dec. 2, 1952   E. R. SUMMERS   2,620,461
STARTING ARRANGEMENT FOR DYNAMOELECTRIC MACHINES
Filed Jan. 15, 1952
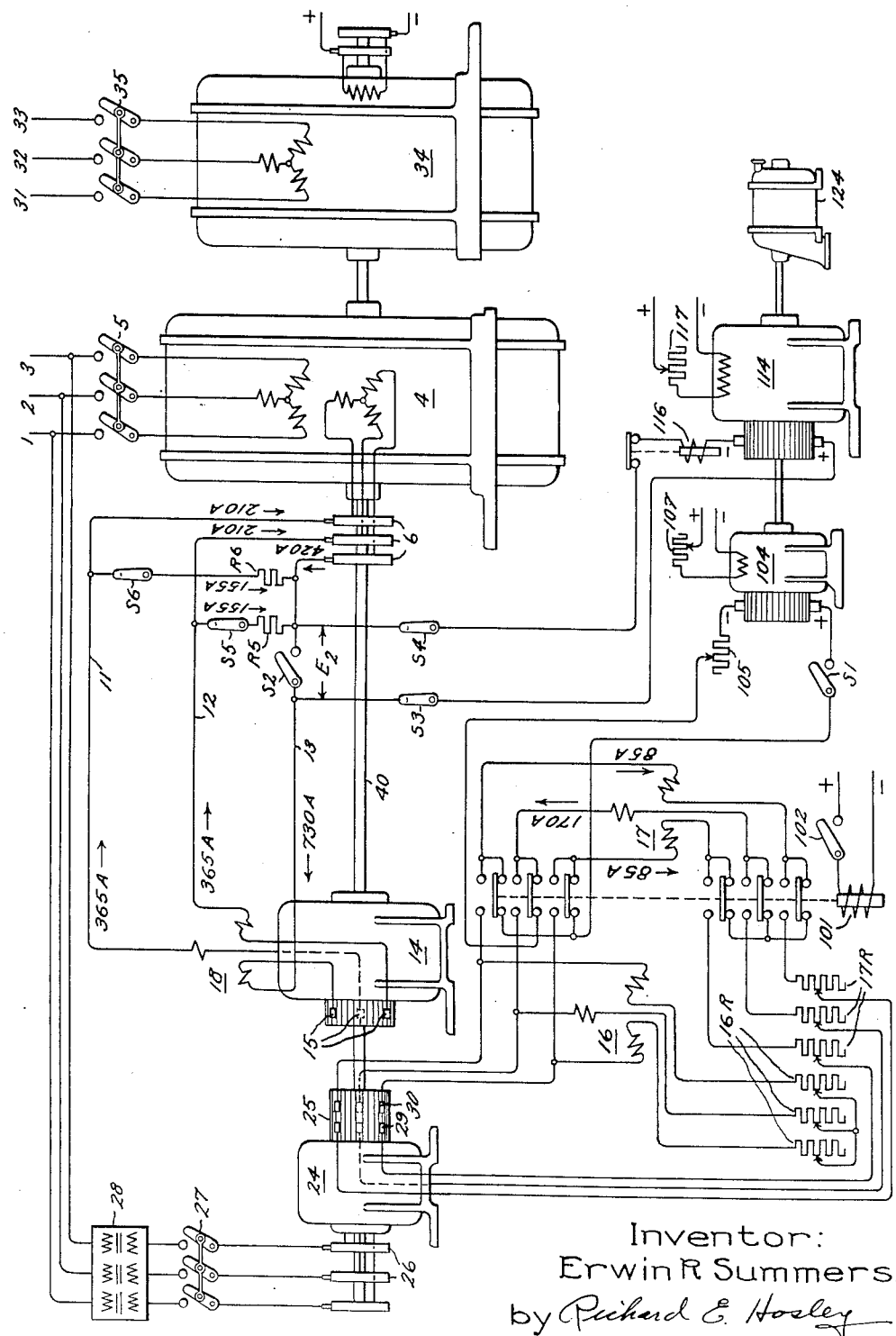
Inventor:
Erwin R Summers,
by Richard E. Hosley
His Attorney.

Patented Dec. 2, 1952

2,620,461

UNITED STATES PATENT OFFICE 2,620,461

STARTING ARRANGEMENT FOR DYNAMO-ELECTRIC MACHINES

Erwin R. Summers, Scotia, N. Y., assignor to General Electric Company, a corporation of New York Application January 15, 1952, Serial No. 266,487

4 Claims. (Cl. 318—137)

The present invention relates to improvements in starting arrangements for large induction dynamoelectric machines of the type utilizing a separate A. C. commutator machine for the regulation of speed, load or power factor as in the so-called "Scherbius" systems which are well known to the art and illustrated in many texts. In general these systems involve a wound rotor induction machine having its rotor winding connected to running control apparatus including an A. C. commutator machine, so that the latter may act as a regulating machine useful, for example, to control the speed and power factor of an induction motor drive, and to control the direction and amount of power transfer, as well as power factor, for a frequency changer set of which the induction machine is a principal unit.

For many reasons it has been found desirable to have the regulating commutator machine coupled both mechanically and electrically to the regulated induction machine, but in the larger size equipments the induction machine will have a high voltage primary winding (for example, for 6900 volt operation), and if the arrangement were to be started by use of the induction machine even the use of starting resistors would not prevent prohibitive values of standstill voltage (on the order of 5000 volts or more) which would be induced in the induction machine wound rotor. Because of low voltage limitations of the regulating machine and copper requirements and space limitation in the induction motor slots, such a wound rotor is ordinarily not insulated for much more than ordinary slip frequency operating voltage (on the order of 300 volts). Furthermore, the induction machine might not stand the high values of magnetizing inrush currents which would be present if full voltage were suddenly impressed on the primary winding.

It is an object of the present invention to provide simple and inexpensive means for overcoming the above-mentioned difficulties.

A further object of the present invention is to provide means for initially magnetizing with a reasonable amount of current and voltage, the secondary of a wound rotor high voltage induction machine controlled for running by a mechanically coupled A. C. commutator machine, as well as means for simultaneously starting rotation of both machines and for bringing them up to speed.

A still further object of the present invention is to provide an inexpensive starting system which will enable a large size Scherbius controlled machine to be started in a smooth and reliable manner.

Another object of the present invention is to provide means for starting a large induction-synchronous frequency changer set from the induction end, without drawing excessive magnetizing current and without exceeding normal operating rotor voltages.

In accordance with the illustrated embodiment of my invention, I provide means for emergency or regular starting from the induction end of a three-phase induction synchronous converter in which the induction machine is Scherbius controlled, by having the Scherbius machine mechanically coupled thereto, and by using the Scherbius machine as a D. C. motor to get the main induction motor up to speed. D. C. current furnished to the three phase Scherbius armature is also used to provide magnetizing current for the three phase induction motor rotor to avoid magnetizing inrush and also to give unlimited time for synchronizing the induction machine onto its line.

The features of my invention which I believe to be novel are set forth with particularity in the appended claims. My invention itself, however, both as to its organization and method of operation, together with further objects and advantages thereof, may be best understood by reference to the following description taken in connection with the accompanying drawing which shows a frequency changer having a 60 cycle synchronous machine and a 25 cycle wound rotor induction machine with the latter controlled by a Scherbius regulating machine and having apparatus provided in accorance with the present invention to provide means for starting the set when the set cannot be started from the synchronous end or by a starting motor (not shown) tied to the same system and coupled to the shaft of the frequency changer set.

Referring to the drawing, 1, 2 and 3 represent wires of a three phase 25 cycle power distribution circuit and 31, 32 and 33 represent wires of a three phase 60 cycle power distribution circuit. Such distribution systems of different frequency are quite prevalent, for example in steel mills where the 25 cycle line may feed and be fed by old or specialized equipment and the 60 cycle line feeds newer equipment and ties in with a public utility system. Frequency converting equipment of the type described is useful not only to provide for normal transfer of power between systems for reasons of economy, but also to provide an essential reservoir of standby power for emergency operation of continuous processes on either circuit.

In the drawing, 4 is a wound rotor type induction machine having its stator winding connectible through a switch 5 to lines 1, 2, 3 and having its rotating element mechanically coupled to the D. C. excited rotor of a synchronous machine 34 which has its stator winding adapted to be connected through a switch 35 to lines 31—33. As is well known in the art, either machine may operate as a motor or a generator and suitable running control apparatus, such as the Scherbius control hereinafter described, may be provided so that the main set operates as a variable ratio frequency changer, at a speed corresponding to the synchronous speed of the synchronous machine, to provide a flexible tie in which the power factor of each machine and the amount and direction of power transferred can be efficiently controlled without any adjustment of remote generating units which supply the two systems. Thus, even if the 60 cycle synchronous machine has 14 poles so that it must run at substantially 514 R. P. M. and the 25 cycle induction machine has 6 poles corresponding to a synchronous speed of 500 R. P. M., if the induction machine 4 has slip rings 6 connected through lines 11—13 to an A. C. commutator type regulating machine 14 through its commutator brushes 15, and the regulating machine is excited, as through a frequency converter 24, with a frequency corresponding to the frequency of induced currents in the main induction machine rotor, the induction machine can readily be made to run at 514 R. P. M. either as a motor or generator as fully described in U. S. Patents 1,059,771—Scherbius; 1,306,594—Hull; 1,593,400—Gilt; 1,693,296—Hull; and 1,778,599—Hull and Robinson. Further, the frequency of the 25 and 60 cycle systems may vary (as from 24.5 to 25 and 59.5 to 60.5 cycles respectively, or within the range for which the Scherbius regulating system is designed) but the power factor of each unit and the magnitude and direction of power flow can be controlled as described above.

Although in the arrangements of the above-mentioned patents the regulating machine is not shown mechanically connected to the regulated induction machine, it is known that such machines can be interconnected mechanically as well as electrically and as shown in the drawing a common shafting 40 is provided for the rotors of induction machine 4, regulating machine 14, frequency converting exciter 24 and synchronous machine 34.

In accordance with the disclosures in the patents mentioned, the Scherbius regulating machine 14 is an A. C. commutator type machine differing from a D. C. machine in having a three phase arrangement of its brushes 15 and having one or more stator windings, such as a power factor control field exciting winding 16 and a load control field exciting winding 17, both wound for three phase operation. If desired a three phase compensating winding 18 may be provided on the stator of the regulating machine and placed in series, between brushes 15 and lines 11—13, so as to neutralize armature reaction and provide proper interpole excitation.

As described in the patents mentioned, the frequency changing exciter 24 is arranged to be driven at the speed of the induction machine and is provided with an armature having both a commutator 25 and slip rings 26. The stator core of machine 24 has neither slots nor windings and serves simply to complete the magnetic circuit. Current to slip rings 26 is derived through a switch 27 and transformer 28 from the 25 cycle lines 1—3, and it follows that current taken from the commutator 25 will have a frequency corresponding to the slip frequency of any currents in the induction machine wound rotor. The frequency changing exciter is provided with at least one polyphase set of commutator brushes, and in the illustrated embodiment two such sets, 29 and 30, respectively, are assumed independently shiftable about the commutator by manual or automatic brush shifting mechanism (not shown). As fully described in the Hull and Robinson patent, brushes of the respective sets are, for normal operation, connected through variable resistors 17R to opposite ends of different phases of the regulating machine load regulating winding 17, and the three brushes of one set (e. g., 29) may be moved with respect to three brushes of the other set (e. g., 30) about the commutator 25 for the purpose of varying the "load control field" current and the output voltage of the regulating machine 14. In accordance with the present invention, the circuit just described is interrupted by contacts of a relay 101 but the normal operating (or running) condition will exist when relay 101 is picked up as by closing a switch 102. One of the sets of brushes (30) is also shown permanently connected to phases of the regulating machine power factor control winding 16 and the phases of this winding are tied together through Y-connected variable resistors 16R. As explained in the Hull and Robinson patent, the windings 16 and 17 may be wound in the same slots of regulating machine 14 and by thus dividing the exciting windings a more satisfactory control is obtained since the arrangement is such that the magnitudes of the voltages impressed on winding 16 are not changed by relative shifting of the brush sets.

As thus far described, except for the provision of relay 101 the arrangement is more or less conventional, but one trouble has been that if the 60 cycle line is dead, possibly due to storms, strikes or enemy action, the equipment cannot be started because if the induction machine were to be energized from the 25 cycle line at standstill, neither the regulating machine nor the induction machine could stand the excessive currents which would have to be absorbed until the machines got up to speed. In order to overcome this difficulty and to simultaneously provide optimum values of initial magnetizing currents as well as an adequate starting torque, I provide means for supplying proper D. C. voltages and currents to the three phases of the armature winding of the regulating machine, proper D. C. voltages and currents to the three phases of the rotor winding of the induction machine, and proper D. C. voltages and currents to the three phases of at least one of the field exciting windings of the regulating machine. In the illustrated embodiment, relay 101 serves, when dropped out, to disconnect the phases of the regulating machine field winding 17 from the frequency-changing exciter brushes 29 and 30 and alternatively reconnect all of the phases of this field winding in the output circuit of a D. C. generator 104 to simulate an instantaneous three phase condition. With the Y connection shown, two of the phases of this regulating machine field winding are connected through a switch S-1 to one terminal of a D. C. generator 104 and the remaining phase is connected through a rheostat 105 to the other terminal of the same generator. Generator 104 is provided with a field rheostat 107. Generator 104 as well as an additional D. C. generator 114, is driven by an independent prime mover such as an electric motor or an auxiliary turbine 124. Phase wire 13 is adapted to be interrupted midway between slip rings 6 and compensating winding 18 by a switch S-2 and the interrupted ends are adapted to be fed through switches S-3 and S-4 from the terminals of generator 114 which may be controlled by a field rheostat 117.

When switch S-1 is closed (and 101 is not picked up), rheostats 105 and 107 may be varied to give proper D. C. field excitation for the regulating machine 14, and then switch S-2 is opened and switches S-3 and S-4 closed. The A. C. commutator machine 14 may then be operated as a D. C. motor with current going into one phase wire of the commutated armature and out the other two phases as shown by arrows in the drawing. Since the D. C. current required to be supplied to the armature of Scherbius machine 14 is not necessarily of exactly the same value as the D. C. excitation required to be supplied to the rotor of induction machine 4 for magnetizing this machine (to reduce current inrush when the stator is connected to the 25 cycle line), I have provided by-pass resistors R-5 and R-6, respectively connected in series with switches S-5 and S-6 across two pairs of the wires 11—13 (such as 11 and 13 and 12 and 13, as shown) so that (with proper selection of the values of R-5 and R-6) the currents will divide properly to provide optimum amounts for each machine.

For purposes of illustration, it may be assumed that synchronous machine 34 is a 13,650 volt, 3 phase, 60 cycle, 514 R. P. M. machine rated 13,700 kva.; induction machine 4 is a 6600 volt, 3 phase, 25 cycle machine rated 17,400 H. P. at 514 R. P. M.; Scherbius regulating machine 14 is a 340 volt machine rated 1200 kva. at 514 R. P. M.; frequency changing exciter 24 is an 85 volt machine rated 33 kva. at 514 R. P. M.; D. C. generator 104 is rated 5 kw. at 30 volts, and D. C. generator 114 is rated 300 kw. at 375 volts. Then for the starting condition of 101 dropped out, S-2 open, and S-1, S-3, S-4, S-5 and S-6 closed, the values of R-5 and R-6 may be selected so that when the current through S-3 is 730 amps. flowing in a direction indicated by the arrow adjacent the legend 730A on the drawing, and this current flows through one of the phases of the compensating winding 18 and into the commutated armature winding of 14 and divides ½ into each of the other two phases as indicated by the arrows adjacent the legends 365A on the drawing, 155 amps. will flow through each of the resistors R-5 and R-6 as indicated by the arrows adjacent the legends 155A, leaving 210 amps. flowing into each of two phases of the rotor winding of machine 4 through two of the slip rings 6, and 420 amperes returning through the third slip ring 6. Thus the same source of D. C. potential provides both the armature excitation for the Scherbius machine 14 and the rotor magnetizing current for the induction machine 4. Meanwhile the field excitation for Scherbius machine 14 is provided by the generator 104 which, it may be assumed, will cause 85 amperes to flow into each of two phases of the star connected winding 17 and 170 amperes to flow away from the third phase of this winding as indicated by the arrows adjacent the corresponding legends.

Of course the above description is purely by way of illustration. Current values depend on the characteristics of the individual machines used and with some equipments it may be found that the current required by the Scherbius machine is not more than the magnetizing current needed in the induction machine rotor and in such a case the resistors R-5 and R-6 might be placed on the other side of switch S-2 or even eliminated. However, in addition to their function as by-pass current dividers, resistors R-5 and R-6 are useful as discharge resistors, protecting the induction machine windings from voltage surge if there should be any opening of the D. C. supply circuit during starting, and this fact might be decisive in deciding whether they should be retained and where they should be placed for a particular application.

As a precaution, an overcurrent responsive circuit breaker 116 may be included in the circuit from the brushes of machine 114 so that this circuit breaker can operate, for example at 1000 amps., to prevent flashover on the Scherbius machine brushes 15, and overvoltage on the induction machine 4, if the field current of machine 104 alone is changed by a large amount without a compensating change in field current of machine 114, or vice versa.

Circuit breaker 116 may also be found useful to open the rotor circuit in case the D. C. field should be lost on either the Scherbius machine 14 or the generator 114 while the other is excited and the set is running. Otherwise, because of unbalance of induced voltages, short circuit currents of several thousand amperes would surge through the low resistance rotor circuit and cause flashovers on the Scherbius machine and on the generator 114 and also cause overvoltage to be induced in the stator of induction machine 4.

For a complete description of the starting sequence it will first be assumed that the set is at rest, switches 5 and 35 are open (to open-circuit the stators of the induction and synchronous machines), the converter exciter 24 has its slip rings open-circuit (switch 27 open) and has its commutator brushes open-circuit (for example, by rheostats 16-R being run off the end of the associated resistances and relay 101 being dropped out). Switches S-1—S-6 are all assumed to be open. The regulating machine load control field 17 is Y connected (because 101 is dropped out) and it is assumed that turbine 124 has been started. The starting sequence is then as follows:

(1) Switch S-1 is closed and rheostat 105, or the field control 107 of generator 104, is adjusted to establish about 170 amperes output. Generator 114 is first run with zero field, and it being assumed that switch S-2 is open, switches S-3, S-4, and, if used, S-5 and S-6, are closed.

(2) Generator 114 then has its field gradually increased, as by manipulation of field rheostat 117, until the main converter set starts and comes up to the synchronous speed of induction machine 4.

(3) Rheostat 117 is then adjusted until a steady state synchronous speed is obtained, at which time the currents will be approximately as shown in the drawing. If the voltage induced in the stator of induction machine 4 is then less than line voltage of the 25 cycle system, the rotor current of machine 4 can be raised (at the same R. P. M.) by lowering the field currents of machine 104 and 114 simultaneously in similar proportion. Conversely, the stator voltage of machine 4 can be lowered by raising these field currents (controlled by 107 and 117) in similar nection means including said transformer and alternatively connecting said regulating machine field exciting winding to one of said D. C. voltage sources so that D. C. current will flow in one direction in one of the phases of said winding and in the opposite direction in the other two phases thereof, switching means for interrupting one of the phase wires normally connecting said regulating machine brushes and said induction machine slip rings, switching means for connecting the interrupted ends of said phase wire with one of said D. C. voltage sources so that D. C. current will flow in one direction through one of the phases of said regulating machine rotor winding and in an opposite direction through the other two phases thereof, and in one direction through one of the phases of said induction machine wound rotor and in an opposite direction through the other two phases thereof for magnetizing said rotor windings and starting said machines, and a plurality of bypass and discharge resistors connected between phase wires adjacent the terminals of said induction machine slip rings for protecting the wound rotor secondary winding during starting.

3. In combination, two alternating current systems each of which normally has its own generating apparatus of substantially fixed frequency, a pair of mechanically connected alternating current dynamoelectric machines having primary windings adapted to be connected, respectively, to said systems, at least one of said machines being of the asynchronous type and provided with a mechanically connected dynamoelectric A. C. commutator type regulating machine for providing a variable ratio tie between said systems, and emergency starting means for said machines, said emergency starting means including D. C. voltage supply means connectible to said asynchronous machine for initial magnetization thereof, and said emergency starting means including D. C. voltage supply means connectible to said A. C. commutator type regulating machine for causing the operation of said regulating machine as a motor.

4. In combination with a frequency changer comprising a main set having a synchronous machine and a wound rotor induction machine with their rotary members mechanically connected together, said frequency changer also comprising a regulating machine having a three phase set of commutator brushes adapted for normal operation of said set to be connected by a three phase line and slip ring brushes and slip rings to the wound rotor of said induction machine, said regulating machine also having at least one three phase stator field exciting winding, running control apparatus including a rotary frequency changer exciter coupled to the other machines and having slip rings and a commutator and a three phase set of commutator brushes adapted for normal operation of said set to be connected to the phases of said regulating machine stator field exciting winding to excite said regulating machine at the slip frequency of said induction machine, and apparatus for starting said frequency changer by running said regulating machine as a D. C. motor, said last mentioned apparatus comprising means supplying at least one D. C. voltage and comprising switching means disconnecting said exciter commutator brushes from said regulating machine stator winding and alternatively connecting said stator winding in a simulated three phase relation and supplied from said D. C. voltage supplying means to produce current in one direction in two of said phases and in an opposite direction in the third phase, said apparatus for starting also comprising additional switching means disconnecting one of said three phase lines normally connecting said regulating machine commutator brushes to said induction machine rotor winding and alternately inserting in said line a D. C. voltage to cause D. C. current to flow in one direction in one phase of the rotor of said regulating machine and in an opposite direction in the other two phases and in one direction in one phase of the rotor winding of said induction machine and in an opposite direction in the remaining phases, and resistors between said phase lines to bypass a portion of said current so that the magnetizing current applied to said induction machine will not exceed a predetermined value during starting, and means for disconnecting said resistances, and said D. C. voltages and reconnecting said control apparatus for normal running operation of the equipment.

ERWIN R. SUMMERS.

No references cited.